US008223270B2

(12) United States Patent
Hayashi et al.

(10) Patent No.: US 8,223,270 B2
(45) Date of Patent: Jul. 17, 2012

(54) TRANSMITTER, RECEIVER, TRANSMISSION METHOD, RECEPTION METHOD, TRANSMISSION PROGRAM, RECEPTION PROGRAM, AND VIDEO CONTENT DATA STRUCTURE

(75) Inventors: Morihiko Hayashi, Kanagawa (JP); Jun Yonemitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1262 days.

(21) Appl. No.: 11/594,711

(22) Filed: Nov. 8, 2006

(65) Prior Publication Data

US 2007/0110389 A1      May 17, 2007

(30) Foreign Application Priority Data

Nov. 11, 2005 (JP) .................................. 2005-327400

(51) Int. Cl.
*H04N 9/74* (2006.01)
(52) U.S. Cl. ....................................................... 348/578
(58) Field of Classification Search .................. 348/578; 386/125, 110, 248–251, 283, 328, 329, 344.346; 725/28
See application file for complete search history.

(56) References Cited

U.S. PATENT DOCUMENTS

| | | | | |
|---|---|---|---|---|
| 5,778,135 A | * | 7/1998 | Ottesen et al. | 386/282 |
| 5,784,528 A | * | 7/1998 | Yamane et al. | 386/112 |
| 7,032,177 B2 | * | 4/2006 | Novak et al. | 715/723 |
| 7,826,718 B2 | * | 11/2010 | Walls et al. | 386/241 |
| 2002/0013948 A1 | * | 1/2002 | Aguayo et al. | 725/91 |

FOREIGN PATENT DOCUMENTS

JP      11-341438 A      12/1999
JP      2005-005916 A      1/2005

* cited by examiner

*Primary Examiner* — Jefferey Harold
*Assistant Examiner* — Michael Teitelbaum
(74) *Attorney, Agent, or Firm* — Wolf, Greenfield & Sacks, P.C.

(57) ABSTRACT

A transmitter which transmits video content via a predetermined network, wherein the video content is encoded while an image group containing a plurality of frame images is handled as a processing unit, the transmitter includes a formation unit and a transmission unit. The formation unit is configured to form invalid-image information for an image group containing at least an edit point of edited video content in order to indicate invalid frame images within the image group in accordance with edit point information about the edited video content. The transmission unit is configured to transmit video content via the predetermined network and, if there is invalid-image information formed by the formation unit, transmit the invalid-image information before transmitting the associated image group.

13 Claims, 8 Drawing Sheets

FIG. 5
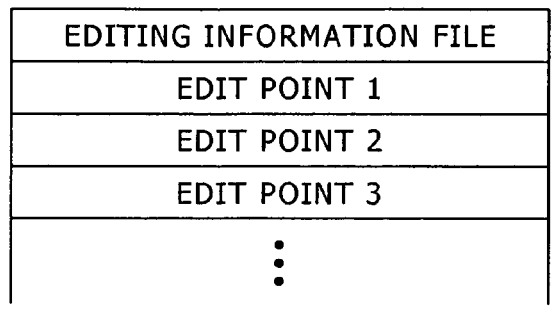
FIG. 6A
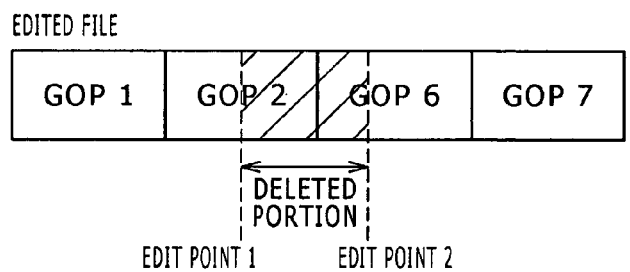
FIG. 6B
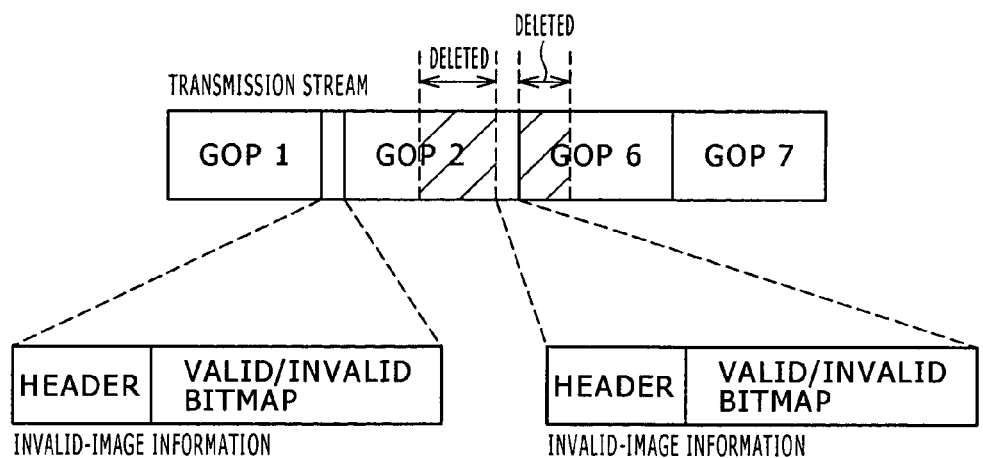
FIG. 6C          FIG. 6D

F I G . 9
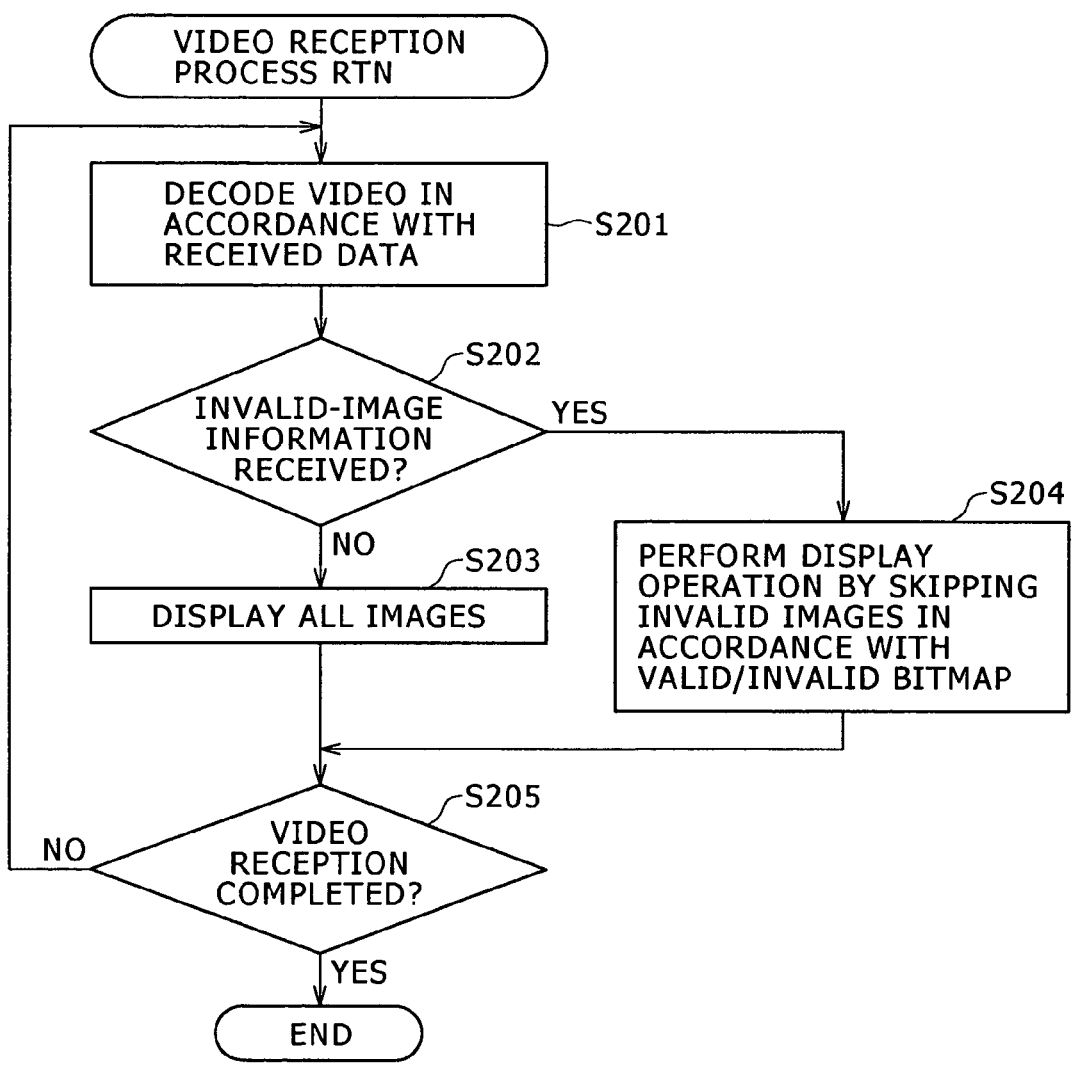

TRANSMITTER, RECEIVER, TRANSMISSION METHOD, RECEPTION METHOD, TRANSMISSION PROGRAM, RECEPTION PROGRAM, AND VIDEO CONTENT DATA STRUCTURE

CROSS REFERENCES TO RELATED APPLICATIONS

The present invention contains subject matter related to Japanese Patent Application JP 2005-327400 filed in the Japanese Patent Office on Nov. 11, 2005, the entire contents of which being incorporated herein by reference.

BACKGROUND OF THE INVENTION

1. Field of the Invention

The present invention relates to apparatuses, methods, programs, and video content data structure for allowing devices connected to a home network system or the like to exchange and properly use video content.

2. Description of the Related Art

A variety of movies and other pieces of video content are supplied as digital content. Some of them are recorded on DVDs (Digital Versatile Discs) or other recording media, while the others are transmitted through broadcasting media or networks such as the Internet. However, the digital content often contains violent scenes or other scenes that should not be viewed by children.

Under the above circumstances, there is a scheme for adding rating information to digital content for the purpose of allowing a reproducing apparatus to identify scenes inappropriate for children, providing the reproducing apparatus with a so-called rating mode, and keeping the reproducing apparatus from normally playing back the scenes marked by the rating information if the reproducing apparatus is placed in the rating mode.

The invention disclosed by Japanese Patent Application JP 2005-44506 (referred to as Patent Document 1 hereinafter) relates to an apparatus for adding necessary information to digital content or playing back digital content by using added information, which incorporates a technology for making it easy to use a so-called rating function that does not normally reproduce specific scenes as described above.

The use of the technology described in Patent Document 1 makes it possible to add necessary information in the unit of a GOP (Group Of Picture), which the unit of processing for motion picture compression (encoding) by an MPEG (Moving Picture Experts Group) method. This enables a reproducing apparatus to control video data on an individual GOP basis and properly handle various rating modes.

SUMMARY OF THE INVENTION

Meanwhile, digital video recorders such as DVD recorders and hard disk recorders are widely used in general households. Under these circumstances, a home network system in which a digital video recorder, a digital television receiver, a personal computer, and the like are interconnected is proposed.

In such a home network system, it is possible to transmit a movie or other digital content to a network from a digital video recorder installed in a living room, receive the transmitted digital content with a digital television receiver installed in a study room, and reproduce the digital content in real time by exercising a so-called streaming reproduction, thereby supplying the digital content to the user.

In a general household digital video recorder, the video content supplied to it is compressed (encoded) by an MPEG2 or other motion picture compression method (motion picture encoding method) and recorded on a recording medium. The MPEG2 and other similar motion picture compression methods (encoding methods) use a motion-compensated inter-frame predictive coding scheme, which reduces the amount of information by making use of time redundancy. The unit of processing for data compression (encoding) by these methods is a GOP, which is an image group containing a plurality of frames.

Therefore, even when the user edits the video content (digital content) recorded on a digital video recorder recording medium on an individual image basis, a general household digital video recorder stores an actual file on an individual GOP basis. When the file is to be reproduced, the general household digital video recorder reproduces a GOP image and then cuts out a necessary image (frame image) to reproduce the edited image.

However, when the video content edited in the digital video recorder is transmitted to a home network and distributed to another apparatus, only the video content (video file) edited in the unit of a GOP is transmitted. Therefore, a part of a cut image (video) is unexpectedly reproduced. In other words, since the video content is transmitted on an individual GOP basis, a GOP containing an image deleted for editing purposes is entirely transmitted. Consequently, the receiving end reproduces an image that should be deleted.

The above problem can be solved by transmitting editing information in the unit of an image, which is stored inside the digital video recorder, to a streaming destination in advance. However, another problem arises because the editing information varies, for instance, with the video compression method and has a complicated structure. Further, when the result of editing is encoded anew, an unnecessary image can be removed from the file. However, the use of such a method may require an increased amount of processing time and additional hardware.

The technology described in Patent Document 1 may be applied to transmit digital content with individual GOPs labeled either "necessary" or "unnecessary", and exercise control so that the receiving end does not reproduce the GOPs labeled "unnecessary". However, this process is performed on an individual GOP basis and may not be performed in the unit of a frame image. In this case, therefore, unnecessary images are reproduced or necessary images might not be reproduced.

The present invention has been made in view of the above circumstances, clears the above problems, and makes it possible to perform editing in the unit of a frame image, properly transmit video content that is compressed in the unit of an image group, which contains a plurality of frame images, and allow the receiving end to perform streaming reproduction of edited video content.

In solving the above problems, according to an embodiment of the present invention, there is provided a transmitter which transmits video content via a predetermined network, wherein the video content is encoded while an image group containing a plurality of frame images is handled as a processing unit, the transmitter including a formation unit and a transmission unit. The formation unit is configured to form invalid-image information for an image group containing at least an edit point of edited video content in order to indicate invalid frame images within the image group in accordance with edit point information about the edited video content. The transmission unit is configured to transmit video content via the predetermined network and, if there is invalid-image information formed by the formation unit, transmit the invalid-image information before transmitting the associated image group.

In the transmitter described above, the formation unit forms invalid-image information, which indicates invalid frame images to be deleted from an image group containing an edit point, in accordance with the edit point information stored in a predetermined edit point retention section. When edited video content is to be transmitted, the transmission unit transmits the invalid-image information, which is formed by the formation unit, before transmitting the associated image group.

When the edited video content is to be transmitted via the predetermined network, the apparatus at the video content receiving end can then be informed that images rendered unnecessary due to editing exist in an image group to which the invalid-image information is attached, and clearly notified of unnecessary images.

According to another embodiment of the present invention, there is provided a receiver for receiving video content that is encoded while an image group containing a plurality of frame images is handled as a processing unit and is transmitted via a predetermined network, wherein the video content transmitted via the network includes invalid-image information, which indicates invalid frame images within an image group containing an edit point. The receiver includes a reception unit, a decoding unit, a extraction unit, and an output processing unit. The reception unit is configured to receive video content that is transmitted via the predetermined network. The decoding unit is configured to decode encoded video content that is received by the reception unit. The extraction unit is configured to extract the invalid-image information when the video content received by the reception unit is an image group containing the invalid-image information. The output processing unit is configured to refrain from outputting invalid frame images within an image group, to which the invalid-image information is attached, in accordance with the invalid-image information extracted by the extraction unit when the video content decoded by the decoding unit is to be output.

In the receiver described above, the video content received by the reception unit is decoded by the decoding unit, and the invalid image information is extracted by the extraction unit. Further, when the video content decoded by the decoding unit is to be output, the output processing unit exercises control so as to refrain from outputting invalid images that are indicated by the invalid-image information and contained in an image group to which the invalid-image information extracted by the extraction unit is attached.

The receiving end can then properly output the video content, which is edited at the transmitting end, without reproducing images that were invalidated by an editing process at the transmitting end. In other words, the video content can be reproduced in accordance with edits performed at the transmitting end.

Even when the video content (video file) edited in the unit of an image is stored in the unit of a GOP or other similar image group, it is possible to distribute the video content without reencoding it and allow the video content receiving end to output or reproduce images in accordance with editing results.

BRIEF DESCRIPTION OF THE DRAWINGS

FIG. 5 illustrates an editing information file for edited video content;

FIGS. 6A to 6D illustrate edited video content and a transmission format for outgoing video content;

FIG. 9 is a flowchart illustrating a reception process for receiving edited video content.

DETAILED DESCRIPTION OF THE PREFERRED EMBODIMENT

Apparatuses, methods, programs, and data structure according to an embodiment of the present invention will now be described with reference to the accompanying drawings. The following description deals with a case where the present invention is applied to devices constituting a so-called home network system, which is constructed in a household.

[Home Network System Configuration]

Figure 1:
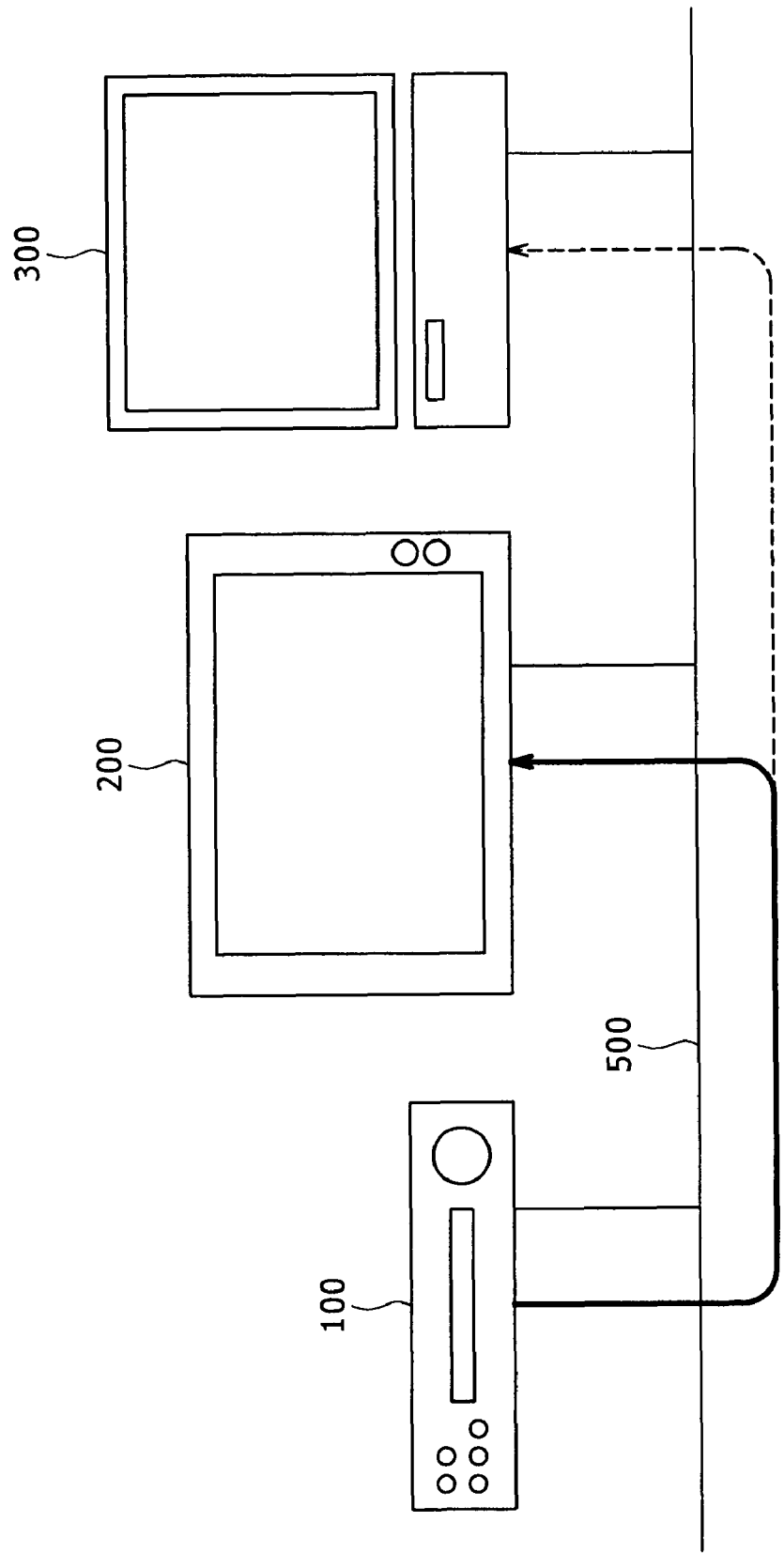
FIG. 1 illustrates a typical configuration of a home network system.

FIG. 1 illustrates the configuration of a home network system according an embodiment of the present invention. As shown in FIG. 1, the home network system according to the present embodiment is configured by connecting a digital video recorder 100, a digital television receiver 200, and a multimedia personal computer 300 (hereinafter referred to as the multimedia PC) to a network 500 such as Ethernet®.

As described later, the digital video recorder 100 permits the use of a DVD and hard disk as recording media. These recording media can be used to record a television broadcast or other video content received via a tuner section incorporated in the digital video recorder and the video content supplied from an external apparatus via a network 500 or the like. Further, the digital video recorder 100 can edit the video content recorded on a recording medium in the unit of a frame. Furthermore, the digital video recorder 100 can reproduce and output the video content recorded on a DVD or hard disk and transmit such video content to the network 500.

The digital television receiver 200 can receive video content and the like, which is supplied via the network 500, perform an internal reproduction process on the received video content, and display a reproduced image on the screen of a built-in display device.

As is the case with a general personal computer, the multimedia PC 300 incorporates a hard disk or other recording medium and can perform various information processing operations by executing various application software programs. Further, the multimedia PC can transmit various pieces of content, which are recorded on a built-in recording medium, to the network 500, and receive video content supplied via the network 500 and record the supplied video content on the built-in recording medium or perform a reproduction process to display a reproduced image on the screen of a built-in display device.

The digital video recorder 100, digital television receiver 200, and multimedia PC 300 can basically transmit and receive various control signals, data, and the like to each other via the network 500. Therefore, the digital video recorder 100 can supply television broadcasts, movies, and other video content to the digital television receiver 200 and multimedia PC 300, which are connected to the network 500, via the network 500, as indicated by a solid-line arrow and broken-line arrow in FIG. 1.

For the sake of brevity, however, it is assumed in the following embodiment description that the digital video recorder 100 supplies MPEG-compressed video content to the digital television receiver 200 via the network 500 as indicated by the solid-line arrow in FIG. 1.

In the present embodiment, the digital video recorder 100 can perform edits in the unit of a frame as described above and delete, for instance, an unnecessary scene from a series of video content. When the video content edited in the above manner is supplied to the digital television receiver 200 via the network 500 for streaming reproduction purposes, the digital television receiver 200 may not be able to reproduce the video content supplied from the digital video recorder 100 in accordance with edits performed in the digital video recorder 100.

As regards the video content encoded (compressed) by a so-called motion-compensated inter-frame predictive coding method (data compression method), which makes use of MPEG or other time redundancy to reduce the amount of information, encoding (data compression) is performed in the unit of an image group containing a plurality of frame images, as described later. Therefore, the video content is transmitted/received in the unit of an image group (GOP when an MPEG method is used). Thus, an image group containing an edit point is transmitted/received while it contains frame images deleted by editing. As a result, frame images deleted for editing purposes are supplied to the transmission destination and reproduced unexpectedly.

The digital video recorder 100 and digital television receiver 200, which constitute a home network system according to the present embodiment, cause no inconvenience when video content is edited in the unit of an image group containing a plurality of frame images and transmitted/received via the network 500 for streaming reproduction purposes. The digital video recorder 100 and digital television receiver 200 can be applied to various coding methods.

In other words, the transmitter, transmission method, and transmission program according to an embodiment of the present invention are applied to the digital video recorder 100, which is a part of the home network system according to the present embodiment. The receiver, reception method, and reception program according to an embodiment of the present invention are applied to the digital television receiver 200. Also, the data structure according to an embodiment of the present invention is applied to video content that is transmitted from the digital video recorder 100 to the digital television receiver 200 and subjected to streaming reproduction in the home network system according to the present embodiment.

[Digital Video Recorder and Digital Television Receiver]

The configurations and basic operations of the digital video recorder 100 and digital television receiver 200 will now be described. The description following the description of the configurations and basic operations relates to a feature of the present invention, that is, a scheme for allowing the receiving end to reproduce video content in accordance with edits performed at the transmitting end in a situation where the video content is transmitted/received in the unit of an image group (in the unit of a GOP in the present embodiment) after edits are performed on an individual frame basis.

[Digital Video Recorder]

Figure 2:
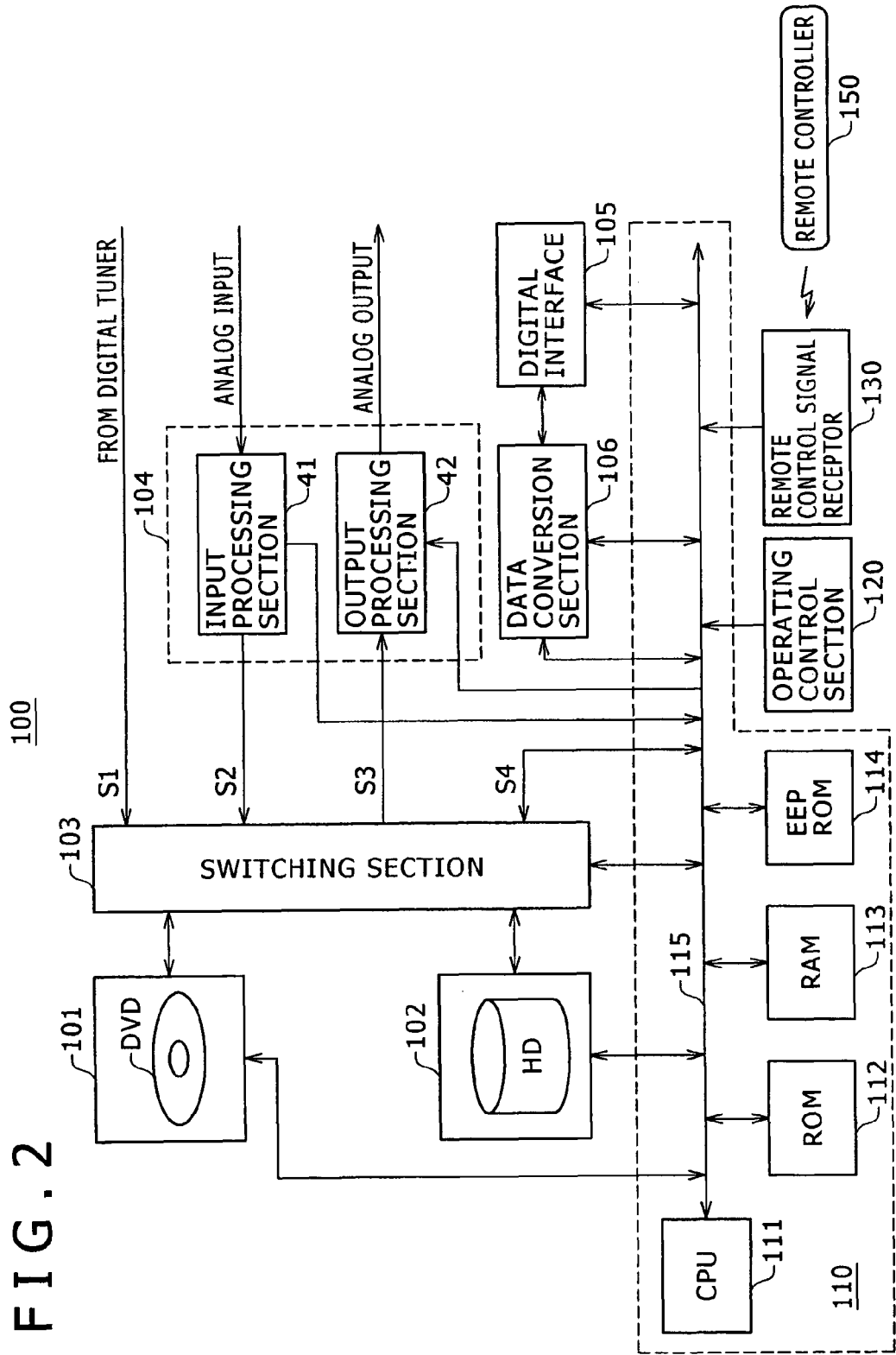
FIG. 2 is a block diagram illustrating a typical configuration of a digital video recorder according to an embodiment of the present invention.

A typical configuration of the digital video recorder 100 will now be described. The digital video recorder 100 is a part of the home network system according to the present embodiment as indicated in FIG. 1. FIG. 2 is a block diagram illustrating a typical configuration of the digital video recorder 100 according to the present embodiment.

As shown in FIG. 2, the digital video recorder 100 according to the present embodiment includes a DVD drive 101, a hard disk drive 102, a switching section 103, an I/O (Input/Output) section 104, a data conversion section 106, a digital interface 105, a control section 110, an operating control section 120, and a remote control signal receptor 130.

The control section 110 controls various sections of the digital video recorder 100 according to the present embodiment. It is a microcomputer in which a CPU (Central Processing Unit) 111, a ROM (Read Only Memory) 112, a RAM (Random Access Memory) 113, and an EEPROM (Electrically Erasable and Programmable ROM) 114 are interconnected via a CPU bus 115.

The CPU 111 is a main control section that executes various programs, forms control signals to be supplied to various sections, and supplies such control signals to various sections. The ROM 112 stores programs to be executed by the CPU 111 and data necessary for processing. The RAM 113 is mainly used as a work area, which temporarily stores, for instance, a report on an ongoing process. The EEPROM 114 is a so-called nonvolatile memory. This nonvolatile memory stores and retains data that should be retained even after the digital video recorder 100 is turned off, that is, for instance, user-defined parameters and a function enhancement program.

The control section 110 is connected to the operating control section 120. The operating control section 120 includes a power on/off key, a play key, a pause key, a stop key, a fast forward key, a rewind key, and various other operating control keys. The operating control section 120 receives an operating control input from the user, converts the received operating control input to an electrical signal, and supplies the electrical signal to the control section 110. This enables the control section 110 to control various sections of the digital video recorder 100 in compliance with instructions from the user.

Further, the control section 110 is connected to the remote control signal receptor 130. The remote control signal receptor 130 receives a remote control signal from a remote controller (remote commander) 150, which is held and operated by the user. When the remote controller 150 receives an operating control input from the user, it transmits an infrared or other remote control signal accordingly. The remote control signal receptor 130 converts the received remote control signal to an electrical signal and supplies the electrical signal to the control section 110.

As described above, the remote controller 150 receives an operating control input from the user and transmits a remote control signal accordingly. As is the case with the operating control section 120, the remote controller 150 includes a power on/off key, a play key, a pause key, a stop key, a fast forward key, a rewind key, numeric keys, cursor keys, and various function keys. Thanks to these operating control keys, the remote controller 150 can receive various instructions (operating control inputs) for the digital video recorder 100 and transmit them to the digital video recorder 100 as remote control signals.

The digital video recorder 100 according to the present embodiment includes a DVD drive 101 and a hard disk drive 102. A DVD, which is a recording medium, can be inserted into and removed from the DVD drive 101. Under control of the control section 110, the DVD drive 101 records data on an inserted DVD or reads data recorded on the DVD.

The hard disk drive 102 includes a hard disk having a capacity as large as several hundreds of gigabytes (the hard disk is marked "HD" in FIG. 2). Under control of the control section 110, the hard disk drive 102 records data onto or reads recorded data from the hard disk.

The switching section 103 performs switching operations to select an input system from which data is to be received and select a drive to which the data is to be output, or select a drive from which data is to be read and select an output system to which the data is to be output. Two input systems, such as a digital input system S1 and an analog input system S2, are connected to the switching section 103. Further, an analog output system S3 is connected to the switching section 103. Moreover, a digital input/output system S4 is connected to the switching section 103.

For example, the digital input system S1 supplies to the switching section 103 a digital television broadcast signal (TS (Transport Stream) signal), which is supplied from a digital broadcast wave tuner (not shown) that is incorporated in the digital video recorder 100.

The analog input system S2 receives a signal through an analog broadcast wave tuner and analog input terminal (not shown), which are incorporated in the digital video recorder 100, allows an input processing section 41 in the I/O section 104 to convert the received signal to digital data, forms video content (TS signal) for recording onto a recording medium by performing an encoding process (data compression process) according to an MPEG method in the present embodiment or by performing a packetization process, and supplies the video content to the switching section 103.

The analog output system S3 causes an output processing section 42 in the I/O section 104 to receive the video content from the DVD drive 101 or hard disk drive 102, that is, the video content output from the switching section 103, and performs packet separation of the video content. Further, the analog output system S3 formulates video content for analog output by performing a decoding process (data decompression process) or by performing a conversion process to obtain an analog signal, and outputs the formulated video content to a monitor image receiver or the like via an analog output terminal.

The digital input/output system S4 includes a path that is connected to the switching section 103 via the digital interface 105, data conversion section 106, and control section 110. It is connected to the network 500 via the digital interface 105.

The digital input/output system S4 receives digital data addressed to it, which is transmitted via the network 500, through the digital interface 105, and supplies the received digital data to the data conversion section 106. The data conversion section 106 converts the supplied digital data into a format that can be processed in it, and supplies the converted data to the control section 110. The control section 110 temporarily stores control data and the like in the RAM 113 for use. However, the control section 110 converts the video content and the like into a TS signal that is formatted for recording, and supplies the resulting TS signal to the switching section 103. As described above, the digital input/output system S4 converts the video content and other data received via the network 500 so that it can be recorded onto a DVD or hard disk.

The digital input/output system S4 causes the control section 110 to receive the video content (TS signal) that is supplied from the DVD drive 101 or hard disk drive 102 and output from the switching section, and to perform a process, for instance, for adding necessary data, supplies the processed video content to the data conversion section 106, causes the data conversion section 106 to convert the video content to a transmission signal, transmits the resulting signal to the network 500 via the digital interface 105, and supplies the content and the like to the digital television receiver 200 or other target device.

As described above, the digital video recorder 100 according to the present embodiment includes the I/O section 104, which is equipped with the input processing section 41 and output processing section 42. It can receive an input analog content, convert the analog content to digital content, and record the digital content onto a recording medium, or convert the digital content read from a recording medium to analog content and output the resulting analog content.

Further, the digital video recorder 100 can record onto a recording medium a digital broadcast wave signal that is received via the digital input system S1, or digital content that is received via the digital input/output system S4, or supply the digital content recorded on a recording medium to a device connected to the network 500 via the network 500.

FIG. 2 excludes the digital broadcast wave tuner and analog broadcast wave tuner that are mounted in the digital video recorder 100. However, it is possible to receive signal supplies from an external digital broadcast wave tuner and analog broadcast wave tuner without incorporating the digital broadcast wave tuner and analog broadcast wave tuner into the digital video recorder 100.

[Digital Television Receiver]

Figure 3:
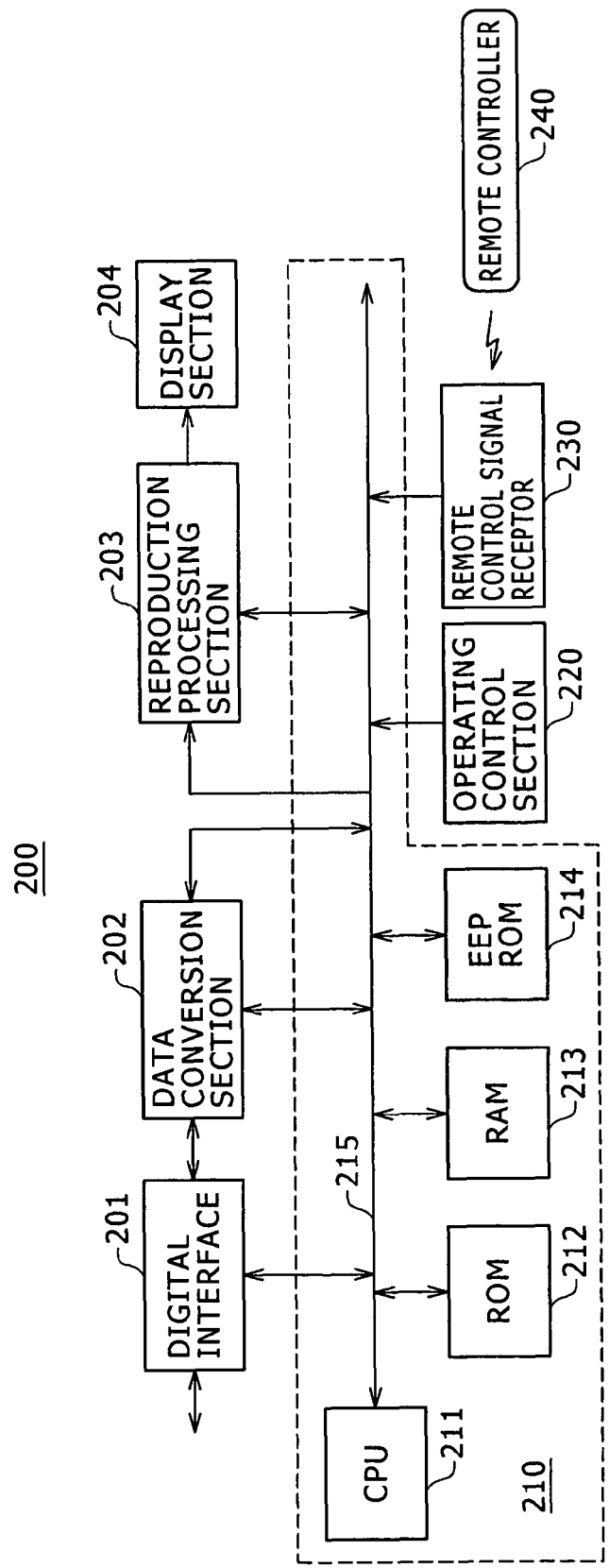
FIG. 3 is a block diagram illustrating a typical configuration of a digital television receiver according to an embodiment of the present invention.

A typical configuration of the digital television receiver 200, which is a part of the home network system according to the present embodiment shown in FIG. 1, will now be described. FIG. 3 illustrates a configuration example of the digital television receiver 200 according to the present embodiment.

As shown in FIG. 3, the digital television receiver 200 according to the present embodiment includes a digital interface 201, a data conversion section 202, a reproduction processing section 203, a display section 204, a control section 210, an operating control section 220, and a remote control signal receptor 230.

The control section 210 controls various sections of the digital television receiver 200 according to the present embodiment. It is a microcomputer in which a CPU 211, a ROM 212, a RAM 213, and an EEPROM 214 are interconnected via a CPU bus 215.

The CPU 211 is a main control section that executes various programs, forms control signals to be supplied to various sections, and supplies such control signals to various sections. The ROM 212 stores programs to be executed by the CPU 211 and data necessary for processing. The RAM 213 is mainly used as a work area, which temporarily stores, for instance, a report on an ongoing process. The EEPROM 214 is a so-called nonvolatile memory. This nonvolatile memory stores and retains data that should be retained even after the digital television receiver 200 is turned off, that is, for instance, user-defined parameters and a function enhancement program.

The control section 210 is connected to the operating control section 220. The operating control section 220 includes a power on/off key and various other operating control keys. The operating control section 220 receives an operating control input from the user, converts the received operating control input to an electrical signal, and supplies the electrical signal to the control section 210. This enables the control section 210 to control various sections of the digital television receiver 200 in compliance with instructions from the user.

Further, the control section 210 is connected to the remote control signal receptor 230. The remote control signal receptor 230 receives a remote control signal from a remote controller (remote commander) 240, which is held and operated by the user. When the remote controller 240 receives an operating control input from the user, it transmits an infrared or other remote control signal accordingly. The remote control signal receptor 230 converts the received remote control signal to an electrical signal and supplies the electrical signal to the control section 210.

As is the case with the operating control section 220, the remote controller 240 includes a power on/off key and various other operating control keys. Thanks to these operating control keys, the remote controller 240 can receive various instructions (operating control inputs) for the digital television receiver 200 and transmit them to the digital television receiver 200 as remote control signals.

In the digital television receiver 200 according to the present embodiment, the digital interface 201 provides connection to the network 500. The data conversion section 202 in the digital television receiver 200 receives various digital data that is accepted by the digital interface 201 and supplied via the network 500, converts the supplied digital data into a format that can be processed in it, and supplies the converted data to the control section 210, or receives control data and the like from the control section 210, converts the received data into data that is formatted for transmission to the network 500, and transmits the converted data to the network 500 via the digital interface 201.

When video content is supplied to the control section 210 via the digital interface 201 and data conversion section 202, the control section 210 forwards the video content to the reproduction processing section 203, extracts data necessary for control, and temporarily stores the extracted data in the RAM 213 for use.

Under control of the control section 210, the reproduction processing section 203 performs a decoding process (data decompression process) on the supplied video content, converts the decoded video content to an analog signal, and supplies the resulting video content to the display section 204. The display section 204 includes, for instance, an LCD (Liquid Crystal Display), a PDP (Plasma Display Panel), an organic EL (Electro Luminescence) panel, a CRT (Cathode-Ray Tube), or other display device, receives a video signal that is supplied from the reproduction processing section 203 in accordance with the digital video content, and displays an image according to the supplied video signal on the screen of the display device.

As described above, the digital television receiver 200 according to the present embodiment can perform a real-time reproduction process on the video content supplied through the network 500 and display an image according to the supplied video content on the screen of its display section 204.

For the sake of brevity, a digital television broadcast wave tuner and analog television broadcast wave tuner are not shown in FIG. 3. However, the digital television receiver 200 according to the present embodiment includes a digital television broadcast wave tuner section and analog television broadcast wave tuner section.

The digital broadcast signal of a television broadcast that is received and selected by the digital broadcast wave tuner section is, for instance, supplied to the reproduction processing section 203 and processed. The resulting processed video signal is then supplied to the display section 204. As described above, the digital television receiver 200 according to the present embodiment can cause the screen of the display section 204 to display the image of a television broadcast that is supplied by the received digital broadcast signal and selected in compliance with instructions from the user.

The analog broadcast signal received and selected by the analog broadcast wave tuner section is converted, for instance, by an analog video processing section (not shown) to a video signal that is formatted for supply to the display section 204, and supplied to the display section 204. In this manner, the digital television receiver 200 according to the present embodiment can cause the screen of the display section 204 to display a television broadcast image according to the analog broadcast signal that is received and selected.

[Transmitting Edited Video content to the Network]

As described above, video content that is encoded, for instance, by an MPEG method can be transmitted/received between the digital video recorder 100 and digital television receiver 200 according to the present embodiment via the network 500. However, the MPEG-encoding process uses a motion-compensated inter-frame predictive coding scheme. Therefore, the encoding process is performed in the unit of a GOP, which is an image group containing a plurality of frame images (e.g., 15 consecutive frames of frame images). Consequently, a GOP containing an edit point is transmitted/received while it includes frame images that are deleted for editing purposes, as mentioned earlier. It is therefore probable that frame images deleted for editing purposes may also be supplied to the transmission destination and reproduced unexpectedly.

Figures 4A, 4B:
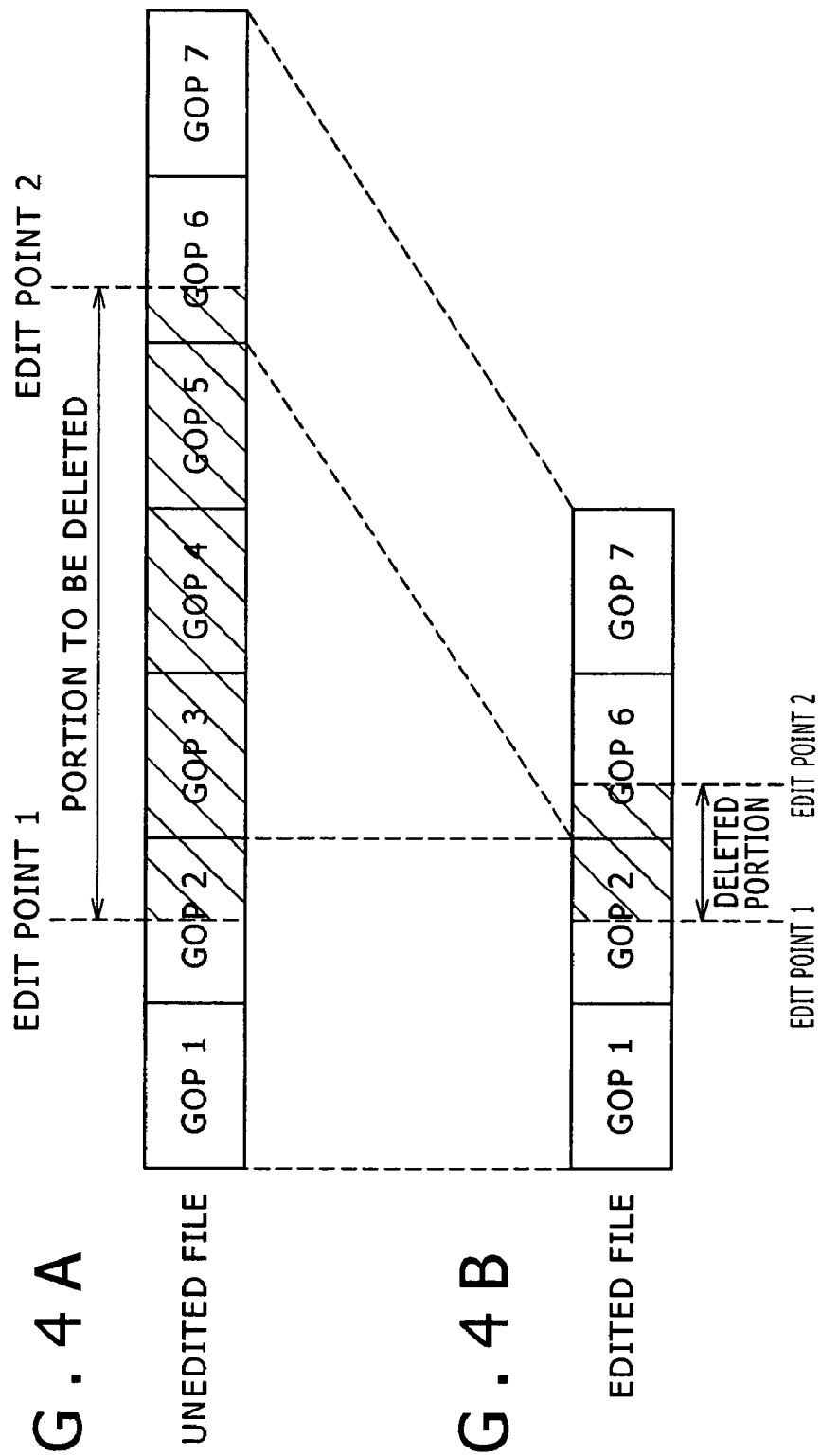
FIGS. 4A and 4B illustrate MPEG-encoded video content that prevails before editing or after editing.

FIGS. 4A and 4B illustrate MPEG-encoded video content (video file) that is edited in the digital video recorder 100. FIG. 4A shows an unedited video file, whereas FIG. 4B shows an edited video file. The following description relates to an edit that is performed on GOPs 1 to 7 of the MPEG-encoded video content as indicated in FIG. 4A.

FIG. 4A illustrates unedited video content (video file), which contains seven GOPs (GOPs 1 to 7). As described earlier, the digital video recorder 100 according to the present embodiment can perform edits in the unit of an image. As indicated in FIG. 4A, it is possible to specify edit points 1 and 2, delete frame images between these two edit points, save the remaining portion, and reproduces it.

In the digital video recorder 100 according to the present embodiment, the video content recorded on the DVD drive 101 or hard disk drive 102 can be reproduced through the switching section 103 and the output processing section 42 of the I/O section 104. While the image reproduced is displayed and confirmed on the display device of the television receiver or like apparatus that is analog-connected to the digital video recorder 100, the operating control section 120 or remote controller 150 can be operated to add edit points and perform edits in the unit of a frame image, for instance, by deleting specific frame images within particular GOPs.

Further, as described earlier, MPEG-encoded video content is encoded in the unit of a GOP, which is an image group containing a plurality of frame images (the unit of information which is a set of a plurality of frames). As mentioned earlier, the reason is that the motion-compensated inter-frame predictive coding scheme, which reduces the amount of information by making use of time redundancy, is adopted to enhance the video content compression efficiency, and that the encoding process is performed in the unit of a plurality of consecutive frame images by using the inter-frame difference. Therefore, if the video content does not remain in the unit of a GOP, the frame images within each GOP may not be reproduced.

More specifically, when the video content containing GOPs 1 to 7 is edited so as to delete a portion between the middle of GOP 2, which is indicated by edit point 1, and the middle of GOP 6, which is indicated by edit point 2, GOPs 3 to 5 do not cause a problem because they are entirely deleted.

However, GOPs 2 and 6 contain not only necessary frame images to be reproduced but also unnecessary frame images that are deleted and should not be reproduced.

As described earlier, however, the necessary frame images within GOPs 2 and 6, which should be reproduced, may not be properly decoded if the deleted frame images, which should not be reproduced, do not exist. Therefore, when edits are performed on the unedited video content (video file) shown in FIG. 4A in the digital video recorder 100 so as to delete a portion between edit points 1 and 2, the edited video content (video file) containing GOPs 1, 2, 6, and 7 is formed as indicated in FIG. 4B.

FIG. 5 illustrates an editing information file that is formed on a recording medium on which edited video content is recorded in a situation where an editing process is performed on video content in the digital video recorder 100. For the edited video content, the editing information file is formed as shown in FIG. 5. The editing information file contains address information that indicates the positions of selected edit points (edit points 1, 2, 3, and so on) on the recording medium.

When the edited video content shown in FIG. 4B is to be reproduced in the digital video recorder 100, the edit point information contained in the editing information file shown in FIG. 5 is also referenced to perform a reproduction process. As regards a GOP containing an edit point, a decoding process is performed with the data on all frame images within the GOP to properly decode all the frame images within the GOP. Further, the deleted unnecessary frame images are not reproduced. As a result, the video content can be reproduced in accordance with edits that are performed in the unit of a frame image.

However, when the edited video content shown in FIG. 4B is supplied as is from the digital video recorder 100 to the digital television receiver 200 via the network 500 for streaming reproduction purposes, the editing information file shown in FIG. 5 does not exist in the digital television receiver 200. Therefore, the deleted frame images within GOPs 2 and 6 are reproduced.

The editing information file could be transmitted from the digital video recorder 100 to the digital television receiver 200. However, the editing information varies, for instance, with the employed compression method. Therefore, it is necessary to transmit/receive the editing information in a manner appropriate for the employed compression method. Further, when a reproduction process is performed with the editing information file, an increased load is imposed on the digital television receiver 200.

Under the above circumstances, the digital video recorder 100 according to the present embodiment forms invalid-image information and adds it to a position immediately before a GOP containing an edit point before transmission. The invalid-image information identifies valid (necessary) frame images and invalid (unnecessary) frame images within the GOP in the unit of a frame image contained in the GOP.

FIGS. 6A to 6D illustrate edited video content (edited video file) and a transmission format for the video content (video file) to be transmitted. FIG. 6A is the same as FIG. 4B. It indicates video content that has been edited in the digital video recorder 100 according to the present embodiment.

As indicated in FIG. 6A, it is assumed that the edited video content, which is formed in accordance with edits performed in the digital video recorder 100 and contains GOPs 1, 2, 6, and 7, is supplied to the digital television receiver 200 via the network 500. It should be noted that GOPs 2 and 6 have edited video content containing an edit point.

In the above instance, the digital video recorder 100 according to the present embodiment controls the DVD drive 101 or hard disk drive 102 that contains a recording medium on which the target edited video content is recorded, and reads the video content to be transmitted. The target video content read from the recording medium is supplied to the control section 110 via the switching section 103.

The control section 110 temporarily stores the video content supplied from the switching section 103 in the RAM 113 in the unit, for instance, of a GOP, references the editing information file formed on the recording medium, and identifies GOPs containing an edit point by judging whether the GOPs constituting the read video content contains an edit point.

When the video content temporarily stored in the RAM 113 is sequentially read and supplied to the data conversion section 106, the control section 110 adds the invalid-image information to a position immediately before the GOPs containing an edit point as shown in FIG. 6B. In the currently used example, the invalid-image information is added to a position immediately before GOP 2 and a position immediately before GOP 6 as shown in FIG. 6B. As shown in FIGS. 6C and 6D, the invalid-image information includes an identification header and valid/invalid bitmap information. The valid/invalid bitmap information identifies valid frame images and invalid frame images within the associated GOP.

In other words, the header in the invalid-image information shown in FIGS. 6C and 6D is a bit string, which indicates that the associated data is invalid-image information. The data following the header is invalid frame image information (invalid frame information) about a GOP, which is the unit of information. The invalid frame image information contains a 15-bit value when, for instance, a set of 15 frame images is subjected to video compression. It is judgment information, which indicates a set of valid images when the leading bit and all the following bits are "1", and indicates a set of invalid images when the leading bit and all the following bits are "0".

Therefore, if, in the example shown in FIGS. 6A and 6B, the first eight frames in GOP 2 are valid frame images and the ninth and subsequent frames are invalid frame images in a situation where each GOP contains 15 frame images, the valid/invalid bitmap of the invalid-image information attached to a position immediately before GOP 2 is the information "111111110000000". If the first four frames in GOP 6 are invalid frame images and the fifth and subsequent frames are valid frame images, the valid/invalid bitmap of the invalid-image information attached to a position immediately before GOP 6 is the information "000011111111111".

The header may be any bit string as far as it indicates that the invalid-image information is contained. Various bit strings are acceptable as the header when they are of a predetermined bit length that may not possibly occur in normal video content.

A section sandwiched between bits "1" or "0" within the valid/invalid bitmap of the invalid-image information may be handled as invalid frames. If a section sandwiched between bits "1" is handled as invalid frames, the valid/invalid bitmap of the invalid-image information to be attached to a position immediately before GOP 2 is the information "100000010000000".

As regards a GOP containing an edit point, the video content to which the invalid-image information is attached is supplied to the data conversion section 106, which is connected to the digital interface 105, and converted to a transmission signal for transmission to the network 500, as indicated in FIG. 6B. When, for instance, the network 500 establishes TCP/IP (Transmission Control Protocol/Internet Protocol) communication, the data conversion section 106 performs a process for packetizing the video content to be transmitted.

Figure 7:
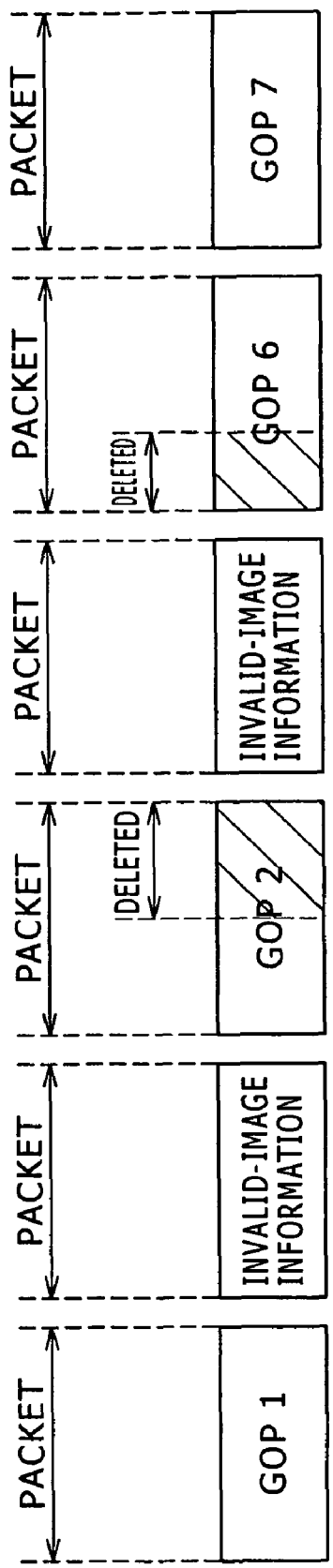
FIG. 7 illustrates the status of video content that is to be transmitted to a TCP/IP network.

FIG. 7 illustrates video content that is formulated by the data conversion section 106 and transmitted to the network 500 via the digital interface 105 in a situation where a transmission stream of edited video content, which is formulated as indicated in FIG. 6B, is transmitted to the network 500 that uses TCP/IP as a communication protocol.

In the example shown in FIG. 7, at least the invalid-image information and a GOP to which the invalid-image information is attached are transmitted as one packet, respectively, with a view toward facilitating the process performed in the digital television receiver 200, which is video content transmission destination. More specifically, the invalid-image information is transmitted after being packetized into one packet, and a GOP to which the invalid-image information is attached is also transmitted after being packetized into one packet.

In the example shown in FIG. 6B, therefore, there are four GOPs (GOPs 1, 2, 6, and 7), and the invalid-image information is attached to GOPs 2 and 6. Consequently, the data to be transmitted is turned into 1-packet data by the data conversion section 106 in the order of GOP 1, the invalid-image information to be attached to GOP 2, GOP 2, the invalid-image information to be attached to GOP 6, GOP 6, and GOP 7, as indicated in FIG. 7. The data is then transmitted to the network via the digital interface 105 and supplied to the digital television receiver 200.

In the example shown in FIGS. 6A to 6D, the video content to be transmitted contains four GOPs. In reality, however, the video content to be transmitted contains a large number of GOPs, and a plurality of GOPs to which no invalid-image information is attached can be transmitted as one packet. However, when at least the invalid-image information and a GOP to which the invalid-image information is attached are transmitted respectively as one packet, it is not necessary to search packets containing a plurality of GOPs for the invalid-image information. Therefore, the invalid-image information can be extracted as appropriate so that a GOP to which the invalid-image information is attached can be properly subjected to a reproduction process by using the invalid-image information.

[Reproduction Video Content that is Edited and Transmitted]

The process performed in the digital television receiver 200, which receives and reproduces the video content that is transmitted with the invalid-image information attached to GOPs containing an edit point as described with reference to FIG. 6B, will now be described.

The video content transmitted from the digital video recorder 100 to the network 500, which is edited and formulated as indicated, for instance, in FIGS. 6B and 7, is received by the digital television receiver 200 via the digital interface 201 of the digital television receiver 200 and supplied to the data conversion section 202. The data conversion section 202 separates the information about GOPs and the like of packetized video content, converts the information into data formatted for processing in the digital television receiver 200, and supplies the resulting data to the control section 210.

The control section 210 supplies GOPs constituting the video content to the reproduction processing section 203, extracts the invalid-image information, and controls the process that the reproduction processing section 203 performs on GOPs to which the invalid-image information is attached, in accordance with the extracted invalid-image information. In other words, the reproduction processing section 203 decodes the frame images constituting a GOP in the unit of a GOP, restores unencoded frame image data, converts the restored frame image data to an analog video signal, and supplies the resulting analog video signal to the display section 204, thereby causing the screen of the display section 204 to display an image in accordance with the supplied video content.

In the above instance, the control section 210 exercises control in accordance with the extracted invalid-image information so as to refrain from outputting invalid frame images, which are decoded in the reproduction processing section 203 together with the other frame images and designated as invalid frame images. Roughly speaking, there are two ways to exercise output control over invalid frame images.

One is to quickly skip invalid frame images and reproduce valid frame images in a rapid sequential manner. The other is to continuously output an immediately preceding valid frame image for the period of an invalid frame image without outputting the invalid frame image. The use of the former method makes it possible to skip invalid frame images and reproduce valid frame images without delay. When the latter method is used, control can be exercised with relative ease because a valid frame image immediately preceding an invalid frame image is to be held and output. The use of the latter method also makes it possible to continuously output a prepared frame image for a period of the invalid frame image.

As described above, the digital television receiver 200 according to the present embodiment, which receives and reproduces video content, can properly extract the invalid-image information and GOPs, perform a decoding process on a GOP to which the invalid-image information is attached by using all the frame images within the GOP to properly decode all the frame images, and restore unencoded frame images. In a reproduction process, however, the digital television receiver 200 can refrain from reproducing invalid frame images in accordance with the invalid-image information.

[Summary of Digital Video Recorder and Digital Television Receiver Operations]

[Digital Video Recorder Operation]

Figure 8:
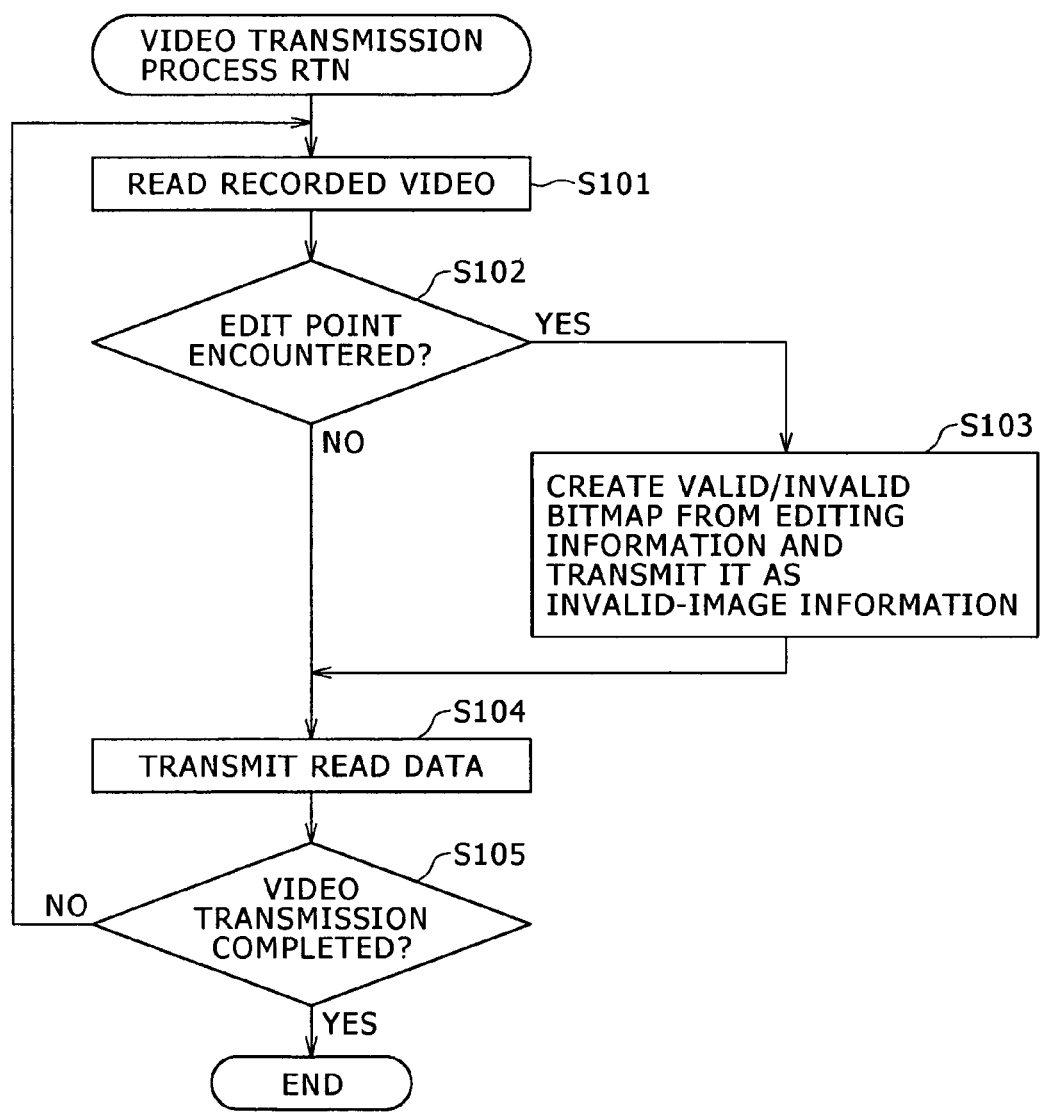
FIG. 8 is a flowchart illustrating a transmission process for transmitting edited video content.

The operation of the digital video recorder 100, which is a part of the home network system according to the present embodiment, will now be described with reference to a flowchart in FIG. 8. FIG. 8 illustrates a process that is mainly performed by the control section 110 when the digital video recorder 100 according to the present embodiment transmits the video content recorded on a DVD inserted into the DVD drive 101 or the video content recorded on the hard disk in the hard disk drive 102 to an apparatus that is connected to the network 500 via the digital interface 105.

The following description relates to a situation where the video content edited in the digital video recorder 100 and recorded on a DVD or hard disk is to be transmitted from the digital video recorder 100 to the digital television receiver 200 via the network 500.

When, in the digital video recorder 100 according to the present embodiment, the operating control section 120 or remote controller 150 receives an instruction input for transmitting specified edited video content recorded on a DVD in the DVD drive 101 or on a hard disk in the hard disk drive 102 to the digital television receiver 200 connected to the network 500 via the digital interface 105 and network 500, the control section 110 performs the process shown in FIG. 8.

First of all, the control section 110 reads the user-specified video content from a recording medium on which it is recorded (step S101). Next, the control section 110 references, for instance, the editing information file concerning the video content, which is created on the recording medium on which the read video content is recorded, and judges whether an edit point exists in the GOPs within the video content to be transmitted (step S102).

If the judgment result obtained in step S102 indicates that an edit point exists in a GOP, the control section 110 creates a valid/invalid bitmap for each of the frame images constituting the GOP in accordance with the editing information, adds header information to the valid/invalid bitmap to create invalid-image information, which was described with reference to FIGS. 6C and 6D, transmits the invalid-image information to the network 500 via the data conversion section 106 and digital interface 105, and delivers the invalid-image information to the digital television receiver 200 (step S103).

As described earlier, the editing information is the information about an address of an edit point on the recording medium. The control section 110 also accurately knows the address of the video content to be read from the recording medium in order to read target video content. In step S102, therefore, it is possible to accurately judge whether the GOPs of the read video content contain edit points.

Further, when information is added to each edit point to indicate whether it is a start point or end point, it is possible to determine whether an encountered edit point is a start point or end point. It is also possible to identify a start point and end point in accordance with the order in which pieces of information are arranged within the editing information file. Therefore, in accordance with an address indicating an edit point on the recording medium, the information indicating whether the address represents a start point or end point, and the address indicating the recording position of a GOP containing the edit point, it is possible to judge whether individual frame images constituting the GOP containing the edit point are valid or invalid, and create a valid/invalid bitmap.

Next, the control section 110 also transmits GOPs that were targeted in step S103 for the creation of invalid-image information to the network 500 via the data conversion section 106 and digital interface 105 (step S104). Similarly, the control section 110 transmits GOPs that were found in step S102 to have no edit points to the network 500 via the data conversion section 106 and digital interface 105 (step S104).

As regards a GOP containing no edit point, the control section 110 performs steps S102 to S104 as described above to simply transmit the GOP to the network 500. As regards a GOP containing an edit point, however, the control section 110 first transmits the invalid-image information to the network 500 and then transmits the GOP to the network 500.

Next, the control section 110 judges whether the specified video content is completely transmitted to the network 500 (step S105). If it is judged that the specified video content is not completely transmitted to the network 500, the control section 110 performs the process again by repeating steps S101 and beyond. If, on the other hand, the judgment result obtained in step S105 indicates that the specified video content is completely transmitted to the network 500, the control section 110 terminates the process shown in FIG. 8.

As described with reference to FIGS. 6A to 6D and 7, the digital video recorder 100 according to the present embodiment can attach the invalid-image information, which includes a valid/invalid bitmap, to a GOP containing an edit point before transmitting the GOP to the network 500. This ensures that the apparatus at the transmission destination can properly perform a decoding process on all the frame images constituting a GOP containing an edit point by using all the frame image data contained in the GOP and restore unencoded frame images. Due to edits performed on an individual frame basis, the apparatus at the transmission destination can accurately distinguish between valid frame images and invalid frame images. Consequently, control can be exercised so that invalid frame images will not be reproduced.

[Digital Television Receiver Operation]

The operation performed by the digital television receiver 200, which is a part of the home network system according to the present embodiment, will now be described with reference to a flowchart in FIG. 9. FIG. 9 shows a process that is mainly performed by the control section 110 when the digital television receiver 200 according to the present embodiment receives video content addressed to it and performs streaming reproduction of the received video content.

The following description relates to a situation where the video content edited in the digital video recorder 100 is transmitted from the digital video recorder 100 to the digital television receiver 200 via the network 500, received by the digital television receiver 200, and subjected to streaming reproduction as described earlier.

When, in the digital television receiver 200 according to the present embodiment, the operating control section 220 or remote controller 240 receives an instruction input for receiving video content that is addressed to the digital television receiver 200 and transmitted via the network 500 and performing streaming reproduction of the received video content, the control section 210 performs the process shown in FIG. 9 to receive the video content that is addressed to the digital television receiver 200 and transmitted via the network 500.

The video content transmitted from the digital video recorder 100 to the network 500 is then received by the digital interface 201 of the digital television receiver 200, converted by the data conversion section 202 into a format that can be processed in the digital television receiver 200, and supplied to the control section 210.

The control section 210 sequentially receives the received data from the data conversion section 202, supplies the video data in the unit of a GOP of the video content to the reproduction processing section 203, performs a decoding process on the video content in the unit of a GOP (step S201), and judges whether the invalid-image information is received (step S202).

If the judgment result obtained in step S202 indicates that no invalid-image information is received, the control section 210 controls the reproduction processing section 203 to reproduce all the frame images within the decoded GOPs (step S203). If, on the other hand, the judgment result obtained in step S202 indicates that invalid-image information is received, the control section 210 controls the reproduction processing section 203 so as to reproduce valid frame images within the GOPs decoded by the reproduction processing section 203 in accordance with the received valid/invalid bitmap and skip invalid frame images (step S204).

After completion of step S203 or step S204, the control section 210 judges whether the video content transmitted via the network 500 has been completely received (step S205). If it is judged that the reception of the video content is not completed, the control section 210 performs the process again by repeating steps S201 and beyond. If, on the other hand, the judgment result obtained in step S205 indicates that the video content transmitted via the network 500 has been completely received, the control section 210 terminates the process shown in FIG. 9.

As described above, the digital television receiver 200 according to the present embodiment can perform a decoding process in the unit of a GOP and properly restore all the frame images constituting a GOP to their unencoded state. When invalid-image information is received, according to the received invalid-image information, the digital television receiver 200 accurately identify valid frame images and invalid frame images within a GOP to which the invalid-image information is attached, reproduce the valid frame images only, and refrain from reproducing the invalid frame images.

In step S204, the digital television receiver 200 skips an invalid frame image and promptly proceeds to process the next GOP, or reproduces a valid frame image that immediately precedes an invalid frame image, and displays a frozen image for a period that corresponds to the period of the invalid frame image. In this manner, the digital television receiver 200 can refrain from reproducing invalid frame images and reproduce the video content in accordance with edits performed in the digital video recorder 100.

As described with reference to the flowcharts in FIGS. 8 and 9, the invalid-image information is attached to a GOP containing a video content (video file) edit point and transmitted so that the receiving end can refrain from displaying invalid frame images, which are deleted and invalidated in accordance with the invalid-image information. Therefore, even when edited video content is subjected to streaming reproduction, deleted, unnecessary frame images will not be displayed.

As is obvious from the above embodiment description, even when the video content is edited in the unit of a frame image and encoded in the unit of a GOP, the home network system according to the present embodiment attaches the invalid-image information, which includes the valid/invalid bitmap to indicate whether individual frame images are valid or invalid, to a GOP containing an edit point and then transmits the GOP.

Therefore, it is not necessary to transmit the editing information file to the transmission destination before video content transmission. Further, the apparatus that receives the video content does not have to incorporate a relatively large buffer that temporarily stores the received video content for proper video content reproduction. Moreover, control can be easily exercised in the unit of a GOP. However, the present embodiment can exercise detailed control on an individual frame image basis because control can be exercised in the unit of a frame image contained in a GOP.

As is obvious from the above embodiment description, the valid/invalid bitmap (control information) in the unit of a frame image (in the unit of a frame) is attached to a position immediately preceding the GOP to be reproduced and transmitted so that the receiving end can exercise reproduction control without rearranging the received data.

Further, a simple circuit can exercise display control when control information is transmitted in the form of bitmaps that are chronologically arranged to indicate whether frame images are valid or invalid. It is also possible to perform a reproduction operation while skipping some edited images, freeze the last-displayed image, or refrain from displaying an image for a specific period of time. Therefore, the present embodiment can also be applied to a situation where there is copyright management information, which entails stringent time control.

In other words, the use of a valid/invalid bitmap makes it easy to refrain from reproducing predetermined frame images within a GOP. Therefore, edited video content can be transmitted to perform streaming reproduction. Further, copyright management can be exercised on an individual frame image basis. Furthermore, the present embodiment can be applied to a so-called rating system in which reproduction control is exercised on an individual frame image basis to prevent children from viewing violent scenes and the like.

In the video content transmitted in accordance with the present embodiment, the valid/invalid bitmap can be universally applied to any video format because it is information in the unit of a frame and video format independent. Since various formats are simultaneously used particularly when video is distributed through a network, it is necessary to use a method of adding control information that is format independent. Therefore, the use of the technology according to the embodiment described above is effective.

However, the present embodiment does not intend to exclude the method of adding the invalid-image information in accordance with the video content format. When, for instance, the video content in DVD-Video format is to be transmitted/received through a network, the invalid-image information may be added to an unoccupied area in the header of each pack and transmitted, and the receiving end may use the added invalid-image information to exercise reproduction control of the video in each pack.

In a situation where video content in DVD-Video format is to be transmitted/received through a network, the detection of invalid-image information may be facilitated, for instance, by adding to an unoccupied area of an RDI (Real time Data Information) pack for copy protection information transmission/reception the information for indicating whether the invalid-image information is attached.

In the above instance, the RDI pack is added in the unit of a video object. Therefore, the RDI pack information indicates whether the invalid-image information is attached to a video object that immediately follows a video object to which the RDI pack is attached.

As described above, it is possible to attach information that indicates the invalid-image information attachment position and indicates whether the invalid-image information is attached, depending on the format of the video content to be transmitted/received. In such an instance, however, the apparatus at the receiving end has to perform a process for extracting the invalid-image information in accordance with the format of the received video content.

Therefore, no matter what format the video content is in, the use of the foregoing embodiment, which attaches the invalid-image information that includes a predetermined header and valid/invalid bitmap and is prepared in a predetermined form to a position immediately before a predetermined image group such as a GOP containing an edit point, makes it possible to attach the invalid-image information, which indicates whether individual frame images are valid or invalid, to the video content and transmit/receive the resulting video content.

Further, the header for the invalid-image information is special information that makes it possible to recognize the header for the invalid-image information. Therefore, the apparatus at the receiving end can properly detect and use the invalid-image information by detecting the header for the invalid-image information.

[Modifications, Etc.]

In the embodiment described above, the function of the means for formulating the invalid-image information for the transmitter is implemented mainly by the control section 110 of the digital video recorder 100, and the function of the transmission means in the transmitter is implemented mainly by the digital interface 105 of the digital video recorder 100. In the embodiment described above, however, the control section 110, data conversion section 106, and digital interface 105 cooperate to implement the functions.

In the embodiment described above, the function of the reception means in the receiver is implemented by the digital interface 201 and data conversion section 202 of the digital television receiver 200, and the function of the decoding means in the receiver is implemented by the reproduction processing section 203 of the digital television receiver 200. Further, the function of the invalid-image information extraction means in the receiver is mainly implemented by the control section 210 of the digital television receiver 200, and the control section 210 and reproduction processing section 203 of the digital television receiver 200 cooperate to implement the function of the output processing means in the receiver.

The transmission method according to an embodiment of the present invention is applied to the digital video recorder 100 according to the embodiment described above. The transmission method is implemented when the control section 110 of the digital video recorder 100 controls various sections to perform a process in accordance with the flowchart in FIG. 8. Similarly, the reception method according to an embodiment of the present invention is applied to the digital television receiver 200 according to the embodiment described above. The reception method is implemented when the control section 210 of the digital television receiver 200 controls various sections to perform a process in accordance with the flowchart in FIG. 9.

The transmission program according to an embodiment of the present invention can be implemented as a program that is executed by the control section 110 of the digital video recorder 100. More specifically, the transmission program to be executed by the CPU 111 in the control section 110 should be formulated so as to perform the steps indicated in the flowchart in FIG. 8. Similarly, the reception program according to an embodiment of the present invention can be implemented as a program that is executed by the control section 210 of the digital television receiver 200. More specifically, the reception program to be executed by the CPU 211 in the control section 210 should be formulated so as to perform the steps indicated in the flowchart in FIG. 9.

When the edited video content is to be transmitted to the network 500, the embodiment described above formulates invalid-image information for a GOP containing an edit point, transmits the invalid-image information before the transmission of the GOP, and transmits the GOP after the transmission of the invalid-image information. However, the present invention is not limited to the use of the above video content transmission method.

For example, when the video content is edited in the digital video recorder 100, the edited video content to which the invalid-image information is attached may be formulated as shown in FIG. 6B, recorded on a recording medium, and transmitted to the network 500. In other words, the invalid-image information may be created at the time of editing or at the time of transmission to the network.

The embodiment described above attaches the invalid-image information to a GOP that is an image group containing an edit point. However, the present invention is not limited to the use of the above method. Alternatively, the invalid-image information may be attached to all GOPs constituting the video content that is edited before transmission.

Attaching the invalid-image information to all GOPs as described above makes it easy to detect the invalid-image information. In this instance, however, the invalid-image information for a GOP containing no edit point indicates that all the images within the GOP are valid.

The embodiment described above assumes that the invalid-image information includes the header and valid/invalid bitmap. However, the present invention is not limited to the use of such invalid-image information. Alternatively, valid/invalid time information may be used instead of the valid/invalid bitmap. A valid frame image period and invalid frame image period may be indicated by using time-period-indicating information. An alternative is to indicate either a valid frame image period or invalid frame image period and judge the remaining GOP portion as the one indicating the other portion.

Therefore, when the valid frame image period of a GOP is indicated by time-period-indicating information, the relevant GOP portion from which the associated portion is excluded can be recognized as an invalid frame image period. Further, when the invalid frame image period of a GOP is indicated by time-period-indicating information, the relevant GOP portion from which the associated portion is excluded can be recognized as a valid frame image period.

A choice between the use of the valid/invalid bitmap and the use of the valid/invalid time information may be provided depending on the system. Alternatively, either one of them may be selected and used at all times. However, when simplification of processing in the transmitter and receiver is taken into consideration, it is preferred that the valid/invalid bitmap be used because it makes it easy to distinguish between valid and invalid frame images. Further, the valid and invalid periods may be indicated by using address information.

The embodiment described above assumes that the video content is MPEG-encoded. The MPEG1, MPEG2, MPEG4, or other similar method may be employed to encode the video content. However, the present invention is not limited to the use of such an encoding method. The present invention can also be applied to a situation where the video content to be transmitted is encoded (subjected to data compression) by various encoding methods that perform a data compression process in the unit of an image group containing a plurality of frame images (frames). For example, the motion-compensated inter-frame predictive coding method, which reduces the amount of information by making use of time redundancy, may be employed to encode the video content.

The embodiment described above assumes that the transmitter, transmission method, and transmission program according to an embodiment of the present invention are applied to the digital video recorder 100. However, the present invention is not limited to such application. The transmitter, transmission method, and transmission program according to an embodiment of the present invention can be applied to a DVD recorder, a hard disk recorder, a multimedia personal computer, and various other electronic devices that incorporate a function for editing video content in the unit of a frame image, are connectable to a network, and can function as a server device within a network.

The embodiment described above assumes that the receiver, reception method, and reception program according to an embodiment of the present invention are applied to the digital television receiver 200. However, the present invention is not limited to such application. The receiver, reception method, and reception program according to an embodiment of the present invention can be applied to a multimedia personal computer, a DVD recorder, a hard disk decoder, and various other electronic devices that incorporate a function for receiving video content in various formats through a network and performing streaming reproduction of the video content for output purposes, and is capable of functioning as a client device within a network.

Further, the home network system according to the embodiment described above may be formulated by establishing a wired connection or by establishing a wireless connection.

The embodiment described above assumes that the present invention is applied to the devices constituting the home network system, which is formulated within a household. However, the present invention is not limited to such application. The present invention can also be applied to a situation where video content edited through the Internet or other wide area network is to be transmitted/received.

For example, the present invention can be applied to a situation where a notebook personal computer that is positioned away from home is used to access a digital video recorder that is installed at home and connectable to a wide are network, receive edited video content stored in the digital video recorder installed at home, and view the video content through the notebook personal computer. Even when edited video content is transmitted/received through the Internet or other wide area network, the receiving end can reproduce the edited video content in accordance with edits performed at the transmitting end.

The embodiment described above assumes that the video processed in the unit of a GOP is transmitted/received and output. In most cases, the video content is such that video and audio are synchronously reproduced as in the case of a movie or television broadcast. Audio data is processed in accordance with video data. Therefore, it goes without saying that unnecessary audio is not reproduced, and that necessary audio is reproduced without fail.

It should be understood by those skilled in the art that various modifications, combinations, sub-combinations, and alterations may occur depending on design requirements and other factors insofar as they are within the scope of the appended claims or the equivalents thereof.

What is claimed is:

1. A transmitter configured to transmit video content via a predetermined network, wherein the video content is encoded as a plurality of image groups each containing a plurality of frame images, the transmitter comprising:
   a formation unit configured to form invalid-image information for an image group of the plurality of image groups that contains at least one edit point, wherein the invalid-image information identifies particular invalid frame images within the image group-in accordance with the at least one edit point;
   a control unit configured to combine the invalid-image information with the video content as combined transmission data, wherein the invalid-image information is associated with the image group of the plurality of image groups in the combined transmission data;
   a transmission unit configured to transmit the combined transmission data via the predetermined network; and
   wherein the invalid-image information includes an area whose number of bits is equal to a number of frame images constituting the image group, and includes bitmap information indicating valid/invalid images or time information indicating an invalid frame image section.

2. A receiver configured to receive video content encoded as a plurality of image groups each containing a plurality of frame images, wherein the encoded video content includes invalid-image information identifying particular invalid frame images within an image group containing an edit point, the receiver comprising:
   a reception unit configured to receive the encoded video content that is transmitted via a predetermined network;
   a decoding unit configured to decode the encoded video content that is received by the reception unit;
   an extraction unit configured to extract the invalid-image information from the encoded video content received by the reception unit when it is determined that the encoded video content includes at least one image group associated with the invalid-image information;
   an output processing unit configured to refrain from outputting at least one invalid frame image within the at least one image group associated with the invalid-image information in accordance with the invalid-image information when the video content decoded by the decoding unit is to be output; and
   wherein the invalid-image information includes an area whose number of bits is equal to a number of frame images constituting the image group, and includes bitmap information indicating valid/invalid images or time information indicating an invalid frame image section.

3. The receiver according to claim 2, wherein the output processing unit is further configured not to read or output the at least one invalid image frame within the at least one image group associated with the invalid-image information.

4. The receiver according to claim 2,
   wherein, when an invalid frame image within an image group associated with the invalid-image information is encountered, the output processing unit continues to output a valid frame image immediately preceding the invalid frame image or output a prepared frame image.

5. A transmission method for transmitting video content via a predetermined network, wherein the video content is encoded as a plurality of image groups each containing a plurality of frame images, the transmission method comprising:
   forming invalid-image information for an image group of the plurality of image groups that includes at least one edit point, wherein the invalid-image information identifies particular invalid frame images within the image group the at least one edit point;
combining the invalid-image information and the video content as combined transmission data, wherein the invalid-image information is associated with the image group of the plurality of image groups in the combined transmission data;
   transmitting the combined transmission data via the predetermined network; and
   wherein the invalid-image information includes an area whose number of bits is equal to a number of frame images constituting the image group, and includes bitmap information indicating valid/invalid images or time information indicating an invalid frame image section.

6. A reception method for receiving video content that is encoded as a plurality of image groups each containing a plurality of frame images, wherein the encoded video content includes invalid-image information identifying particular invalid frame images in an image group containing an edit point indicating at least one invalid frame image within the image group, the reception method comprising:
   receiving the encoded video content that is transmitted via a network;
   decoding the received encoded video content;
   extracting invalid-image information from the encoded video content when it is determined that the encoded video content includes at least one image group associated with the invalid-image information;
   refraining from outputting at least one invalid frame image within the at least one image group associated with the invalid-image information in accordance with the extracted invalid-image information when the decoded video content is to be output; and
   wherein the invalid-image information includes an area whose number of bits is equal to a number of frame images constituting the image group, and includes bitmap information indicating valid/invalid images or time information indicating an invalid frame image section.

7. At least one computer-readable medium having stored thereon a transmission program that when executed by a computer mounted in a transmitter for transmitting video content via a predetermined network, performs a method, wherein the video content is encoded as a plurality of image groups each containing a plurality of frame images, the method comprising:

forming invalid-image information for an image group of the plurality of image groups that includes at least one edit point, wherein the invalid-image information identifies particular invalid frame images within the image group in accordance with at least one edit point;

combining the invalid-image information with the video content as combined transmission data, wherein the invalid-image information is associated with the image group of the plurality of image groups in the combined transmission data;

transmitting the combined transmission data via the predetermined network; and wherein the invalid-image information includes an area whose number of bits is equal to a number of frame images constituting the image group, and includes bit-map information indicating valid/invalid images or time information indicating an invalid frame image section.

8. At least one computer-readable medium having stored thereon a reception program that when executed by a computer mounted in a receiver for receiving video content, performs a method, wherein the video content is encoded as a plurality of image groups each containing a plurality of frame images, wherein the encoded video content includes invalid-image information identifying particular invalid frame images in an image group containing an edit point indicating at least one invalid frame image within the-image group, the method comprising:

receiving the encoded video content that is transmitted via a network;

decoding the received encoded video content;

extracting the invalid-image information from the encoded video content when it is determined that the encoded video content includes at least one image group associated with the invalid-image information;

refraining from outputting at least one invalid frame within the at least one image group associated with the invalid-image information, in accordance with the invalid-image information when the decoded video content is to be output; and wherein the invalid-image information includes an area whose number of bits is equal to a number of frame images constituting the image group, and includes bit-map information indicating valid/invalid images or time information indicating an invalid frame image section.

9. A transmitter for transmitting video content via a predetermined network, wherein the video content is encoded as a plurality of image groups each containing a plurality of frame images, the transmitter comprising:

means for forming invalid-image information for an image group of the plurality of image groups that includes at least one edit point, wherein the invalid-image information identifies particular invalid frame images within the image in accordance with the at least one edit point;

means for combining the invalid-image information with the video content as combined transmission data, wherein the invalid-image information is associated with the image group of the plurality of image groups in the combined transmission data;

means for transmitting the combined transmission data via the predetermined network; and wherein the invalid-image information includes an area whose number of bits is equal to a number of frame images constituting the image group, and includes bit-map information indicating valid/invalid images or time information indicating an invalid frame image section.

10. A receiver for receiving video content encoded as a plurality of image groups each containing a plurality of frame images, wherein the encoded video content includes invalid-image information identifying particular invalid frame images within an image group containing an edit point, the receiver comprising:

means for receiving the encoded video content that is transmitted via a predetermined network;

means for decoding the received encoded video content;

means for extracting the invalid-image information from the encoded video content when it is determined that the encoded video content received by the means for receiving includes at least one image group associated with the invalid-image information;

means for refraining from outputting at least one invalid frame image within the at least one image group associated with the invalid-image information, in accordance with the invalid-image information extracted by the means for extracting when the video content decoded by the means for decoding is to be output; and wherein the invalid-image information includes an area whose number of bits is equal to a number of frame images constituting the image group, and includes bit-map information indicating valid/invalid images or time information indicating an invalid frame image section.

11. The transmitter according to claim 1, wherein the control unit is further configured to combine the invalid-image information with the video content by adding the invalid-image information to the combined transmission data before the image group associated with the invalid-image information.

12. The transmitter according to claim 1, wherein the combined transmission data comprises a plurality of packets configured to be transmitted over the network, wherein the control unit is further configured to add the invalid-image information to the combined transmission data as a packet before at least one packet for the image group associated with the invalid-image information.

13. The transmitter according to claim 1, wherein the control unit is configured to associate the invalid-image information with the image group of the plurality of image groups in the combined transmission data by inserting the invalid-image information in the combined transmission data preceding the image group of the plurality of image groups.

* * * * *